(12) United States Patent
Godwin, IV et al.

(10) Patent No.: US 11,232,330 B2
(45) Date of Patent: Jan. 25, 2022

(54) ADAPTIVE NEURAL NETWORK SELECTION TO EXTRACT PARTICULAR RESULTS

(71) Applicant: Slingshot Aerospace, Inc., Austin, TX (US)

(72) Inventors: David Stuart Godwin, IV, Leander, TX (US); Thomas Scott Ashman, Long Beach, CA (US); Spencer Ryan Romo, Austin, TX (US); Melanie Stricklan, Long Beach, CA (US); Carrie Inez Hernandez, Long Beach, CA (US)

(73) Assignee: Slingshot Aerospace, Inc., Austin, TX (US)

( * ) Notice: Subject to any disclaimer, the term of this patent is extended or adjusted under 35 U.S.C. 154(b) by 136 days.

(21) Appl. No.: 16/275,171

(22) Filed: Feb. 13, 2019

(65) Prior Publication Data

US 2019/0251402 A1 Aug. 15, 2019

Related U.S. Application Data

(60) Provisional application No. 62/630,097, filed on Feb. 13, 2018.

(51) Int. Cl.
*G06K 9/66* (2006.01)
*G06K 9/00* (2006.01)
(Continued)

(52) U.S. Cl.
CPC .......... *G06K 9/66* (2013.01); *G06K 9/00637* (2013.01); *G06K 9/6227* (2013.01);
(Continued)

(58) Field of Classification Search
None
See application file for complete search history.

(56) References Cited

U.S. PATENT DOCUMENTS

| 5,052,043 A | 9/1991 | Gaborski |
| 2003/0182249 A1* | 9/2003 | Buczak ............... H04N 7/16 706/15 |

(Continued)

OTHER PUBLICATIONS

Notification of Transmittal of the International Search Report and the Written Opinion of the International Searching Authority, or the Declaration dated May 9, 2019 in connection with International Patent Application No. PCT/US2019/017876 (14 pages).

(Continued)

*Primary Examiner* — Tom Y Lu
*Assistant Examiner* — Brian D Shin (57) ABSTRACT

Method, electronic device, and computer readable medium embodiments are disclosed. In one embodiment, a method includes receiving image data, manipulating the received image data based on a set of transform parameters, and analyzing the manipulated image data to generate metadata. The metadata statistically describes the received image data. The method also includes selecting a neural network from a plurality of neural networks to perform a second analysis, wherein the neural network is selected based on the generated metadata. The method additionally includes performing a second analysis of the received image data by the selected neural network based on the generated metadata to extract information from the received image data.

20 Claims, 6 Drawing Sheets

(51) Int. Cl.
*G06N 3/04* (2006.01)
*G06N 3/08* (2006.01)
*G06K 9/62* (2006.01)

(52) U.S. Cl.
CPC ......... *G06K 9/6268* (2013.01); *G06N 3/0454* (2013.01); *G06N 3/08* (2013.01)

(56) References Cited

U.S. PATENT DOCUMENTS

| | | |
|---|---|---|
| 2011/0087627 A1 | 4/2011 | Schmid et al. |
| 2012/0269436 A1 | 10/2012 | Mensink et al. |
| 2017/0061249 A1* | 3/2017 | Estrada .................. G06T 5/005 |
| 2017/0076438 A1* | 3/2017 | Kottenstette ........... G06K 9/627 |
| 2017/0154425 A1* | 6/2017 | Pierce ...................... G06T 7/73 |

OTHER PUBLICATIONS

C. Pagano et al., "Context-Sensitive Self-Updating for Adaptive Face Recognition", Computer Vision and Machine Learning with RGB-D Sensors, Jan. 1, 2015, pp. 9-34 (28 pages).

Office Action dated Oct. 19, 2020 in connection with U.S. Appl. No. 16/275,186, 12 pages.

Office Action dated Jun. 25, 2021 in connection with U.S. Appl. No. 16/275,186, 12 pages.

Notice of Allowance dated Oct. 21, 2021 in connection with U.S. Appl. No. 16/275,186, 9 pages.

* cited by examiner

ADAPTIVE NEURAL NETWORK SELECTION TO EXTRACT PARTICULAR RESULTS

CROSS-REFERENCE TO RELATED APPLICATIONS

This application claims the benefit under 35 U.S.C. § 119(e) of U.S. Provisional App. No. 62/630,097, filed Feb. 13, 2018, which application is hereby incorporated herein by reference in its entirety.

TECHNICAL FIELD

This disclosure relates generally to processing remote sensing data. More specifically, this disclosure relates to adaptively selecting a neural network to extract and identify results of remote sensing data based on given input data and desired results.

BACKGROUND

The sophistication and quantity of unnamed aerial vehicles, drones, aircrafts, satellites, and other aerial vehicles are increasing. Many aerial vehicles are capable of remote sensing various aspects of the earth. Remote sensing can be used in a variety of applications such as meteorology, oceanography, agriculture, landscape, geology, cartography, regional planning, education, intelligence and warfare, to name a few. Remote sensing can provide images in visible color as well as images in other spectra. Remote sensing can also provide elevation maps. Interpretation and analysis the data acquired from remote sensing of aerial vehicles is demanding due to the size and quantity of the data.

SUMMARY OF EMBODIMENTS

This disclosure provides an adaptive neural network selection to extract particular results.

In a first embodiment, a method is provided. The method includes receiving image data. The method also includes manipulating the received image data based on a set of transform parameters. The method further includes analyzing the manipulated image data, to generate metadata. The metadata statistically describes the received image data. The method also includes selecting a neural network from a plurality of neural networks to perform a second analysis, wherein the neural network is selected based on the generated metadata. The method additionally includes performing a second analysis of the received image data by the selected neural network based on the generated metadata to extract information from the received image data. In some embodiments the image data is heterogeneous image data.

In another embodiment an electronic device is provided. The electronic device includes an I/O interface configured to receive image data. The electronic device also includes a processor operably coupled to the I/O interface. The processor is configured to manipulate the received image data based on a set of transform parameters. The processor is also configured to analyze the manipulated image data, to generate metadata, wherein the metadata statistically describes the received image data. The processor is further configured to select a neural network from a plurality of neural networks to perform a second analysis, wherein the neural network is selected based on the generated metadata. The processor is additionally configured to perform a second analysis of the received image data by the selected neural network based on the generated metadata to extract information from the received image data.

In yet another embodiment a non-transitory computer readable medium embodying a computer program is provided. The computer program comprising program code that when executed causes at least one processor to receive image data; manipulate the received image data based on a set of transform parameters; analyze the manipulated image data, to generate metadata, wherein the metadata statistically describes the received image data; select a neural network from a plurality of neural networks to perform a second analysis, wherein the neural network is selected based on the generated metadata; and perform a second analysis of the received image data by the selected neural network based on the generated metadata to extract information from the received image data.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

Remote sensing is the acquisition of information about an object without making physical contact with the object. Generally, remote sensing refers to use of an aerial vehicles (such as a satellite or aircraft) to detect and classify objects on earth. In certain embodiments, remote sensing is performed by an aerial vehicle that emits signals that are reflected off the surface of the earth, or an object between the aerial vehicle and the earth, and the reflected signals are detected by the aerial vehicle. For example, the aerial vehicle can emit energy in order to scan objects and areas and a sensor detects and measures the signals that are reflected back from the target. For instance, the signals can be in the form of Radio Detection And Ranging (RADAR) and Light Imaging Detection and Ranging (LIDAR). In certain embodiments, remote sensing can include radio frequency and hyperspectral sensing. Hyperspectral sensing is the generation of images by collecting and processing information across the electromagnetic spectrum. Hyperspectral sensing obtains a spectrum of electromagnetic waves for each pixel of the generated image. Hyperspectral sensing assists in identifying materials and object detection processes. In certain embodiments, remote sensing is performed by an aerial vehicle that captures sunlight that is reflected off of the surface of the earth, or an object between the aerial vehicle and the earth. For example, a sensor on an aerial vehicle can gather radiation that is emitted or reflected by the object or surrounding areas. The radiation can be sunlight.

Various observational satellites are in orbit around the earth. An observational satellite performs remote sensing to capture and record various information about the surface of the earth as well as objects between the satellite and the surface of the earth, such as clouds. Observational satellites can be located in a low earth orbit that circles the earth at a predefined interval, such as one revolution every 90 minutes. Satellites in a low earth orbit can often capture data of the same area of earth every time the satellite passes over the same area via remote sensing. Observational satellites can also be located in a geostationary orbit. A geostationary orbit revolves around the earth at the same rate as the earth rotates. To an observer on earth, a satellite in a geostationary orbit appears motionless.

Remote sensing data from aerial vehicles such as satellites are increasingly available. The high cadence of observational satellites in a low earth orbit provides large quantities of information such as the ability to detect changes for both military and civilian use. For example, in the case of a natural disaster, the ability to detect where damage is, the location of the most damage, safe and unobstructed ingress and egress can directly expedite and improve recovery efforts. However, the interpretation and analysis the data acquired from remote sensing data is difficult to generate due to the processing demands based on the size and quantity of the available data. Further, such data is often unstructured and difficult to extract useful insights. As such, a neural network can be used in the analysis of remotely sensed data.

A neural network is a combination is hardware and software that is patterned after the operations of neurons in a human brain. Neural networks are ideal at solving and extracting information from complex signal processing, pattern recognition, or pattern production. Pattern recognition includes the recognition of objects that are seen, heard, or felt.

Neural networks process and handle information very differently than conventional computers. For example, a neural network has a parallel architecture. In another example, how information is represented, processed, and stored by a neural network also varies from a conventional computer. The inputs to a neural network are processed as patterns of signals that are distributed over discrete processing elements, rather than binary numbers. Structurally, a neural network involves a large number of processors that operate in parallel and are arranged in tiers. For example, the first tier receives raw input information and each successive tier receives the output from the preceding tier. Each tier is highly interconnected, such that each node in tier n can be connected to many nodes in tier n−1 (such as the nodes inputs) and in tier n+1 that provides input for those nodes. Each processing node includes a set of rules that it was originally given or developed for itself over time.

A convolutional neural network is a type of a neural network that is often used to analyze visual imagery. A convolutional neural network is modeled after the biological process of vision in which individual cortical neurons respond to stimuli only in a restricted region of the visual field. The restricted region of the visual field is known as the receptive field. The receptive fields of different neurons partially overlap such that in totality the many neurons cover the entire visual field. Similarly, in a convolutional neural network, each convolutional neuron processes data that is limited to the neuron's respective field.

Neural networks (as well as convolutional neural networks) are often adaptable such that a neural network can modify itself as the neural network learns and performs subsequent tasks. For example, initially a neural network can be trained. Training involves providing specific input to the neural network and instructing the neural network what the output is expected. For example, if the neural network is to identify a city infrastructure, initial training can include a series of images that include city infrastructure and images that do not depict city infrastructure, such as persons, animals, and plants. Each input (city infrastructure, persons, animals, and plants) includes a detail of the infrastructure or an indication that the object is not city infrastructure. By providing the initial answers, this allows a neural network to adjust how it internally weighs a particular decision to improve how to perform a given task. For example, to identify city infrastructure it could be necessary to train a neural network for each particular city. In another example, to identify city infrastructure it could be necessary to train a neural network for types of cities such as rural cities, urban cities, and the like. In another example, to identify city infrastructure it could be necessary to train a neural network based on geographic areas around a city. For instance, a city having a grid-like layout appears differently than a city that follows a natural landmark such as a river or a mountain.

The architectures of a neural network provide that each neuron can modify the relationship between its inputs and its output by some rule. The power of a particular neural network is generated from a combination of (i) the geometry used for the connections, (ii) the operations used for the interaction between neurons, and (iii) the learning rules used to modify the connection strengths, to name a few.

Neural networks are trained to perform specific tasks, as well as given specific types of input data. Due to the various geographical data that can be acquired by remote sensing, neural networks are not scalable to perform the analysis of general input data to produce specific results. Embodiments of the present disclosure provide for an adaptive neural network selection to extract particular results, based on particular input data. Embodiments of the present disclosure provide a neural network framework that adaptively adjusts to overcome various regional and sensor based dependences of a neural network. In certain embodiments, the neural network framework can detect change of remote sensed data of a given location not limited to particular geographic areas. In certain embodiments, the neural network framework can provide infrastructure identification that is not limited to particular geographic areas. Similarly, in certain embodiments, the neural network framework can provide water detection as well as non-water based objects where the analysis is not limited to particular geographic areas.

Figure 1:
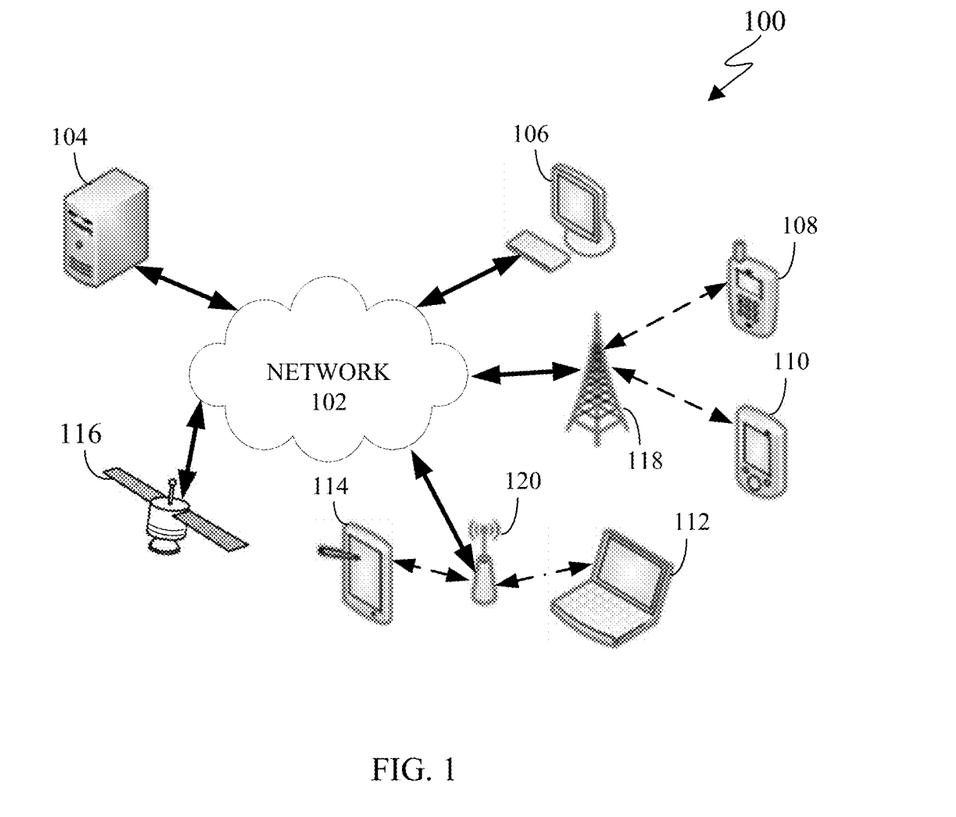
FIG. 1 illustrates an example communication system in accordance with embodiments of the present disclosure.

FIG. 1 illustrates an example computing system 100 according to this disclosure. The embodiment of the system 100 shown in FIG. 1 is for illustration only. Other embodiments of the system 100 can be used without departing from the scope of this disclosure.

The system 100 includes network 102 that facilitates communication between various components in the system 100. For example, network 102 can communicate Internet Protocol (IP) packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

The network 102 facilitates communications between a server 104, a satellite 116, and various client devices 106-114. The client devices 106-114 may be, for example, a smartphone, a tablet computer, a laptop, a personal computer, a wearable device, or a head-mounted display (HMD). The server 104 can represent one or more servers. Each server 104 includes any suitable computing or processing device that can provide computing services for one or more client devices. Each server 104 could, for example, include one or more processing devices, one or more memories storing instructions and data, and one or more network interfaces facilitating communication over the network 102.

The satellite 116 is an object located in orbit around the earth. Satellite 116 can be an observation satellite, a communication satellite, a navigation satellite, a meteorological satellite, a space telescope, and the like. Depending on the type of satellite, satellite 116 can include a variety of instruments such as imaging, telecommunications, navigation, and the like. The satellite 116 can receive and transmit data from server 104 or any client device 106-114. In certain embodiments, satellite 116 can be any aerial vehicle such as a drone, an airplane, a helicopter, a high altitude balloon, and the like.

Each client device 106-114 represents any suitable computing or processing device that interacts with at least one satellite, one server or other computing device(s) over the network 102. In this example, the client devices 106-114 include a desktop computer 106, a mobile telephone or mobile device 108 (such as a smartphone), a personal digital assistant (PDA) 110, a laptop computer 112, and a tablet computer 114. However, any other or additional client devices could be used in the system 100.

In this example, some client devices 108-114 communicate indirectly with the network 102. For example, the client devices 108 and 110 (mobile devices 108 and PDA 110, respectively) communicate via one or more base stations 118, such as cellular base stations or eNodeBs (eNBs). Also, the client devices 112 and 114 (laptop computer 112, and tablet computer 114, respectively) communicate via one or more wireless access points 120, such as IEEE 802.11 wireless access points. Note that these are for illustration only and that each client device 106-114 could communicate directly with the network 102 or indirectly with the network 102 via any suitable intermediate device(s) or network(s), such as base stations 118, access points 120.

Although FIG. 1 illustrates one example of a system 100, various changes can be made to FIG. 1. For example, the system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

The processes and systems provided in this disclosure allow for the satellite 116 to capture images of the earth and transmit the images to the server 104 or any client device 106-114, or a combination thereof for processing. Images can include various types of remote sensing such as spatial, spectral, temporal, and radiometric. For example, spatial resolution is the pixel size of an image representing the size of the surface area that is measured on the ground as determined by the instantaneous field of view of the sensor. Spectral resolution is the wavelength interval size such as the discrete segment of the Electromagnetic Spectrum coupled with the number of intervals that the sensor is measuring. Temporal resolution is the amount of time that passes between imagery collection periods of a specific surface location. Radiometric resolution is the ability of an imaging system to record many levels of brightness, such as contrast, and to the effective grayscale or bit-depth of the sensor. The imaging capability of the satellite 116 can be limited by geometric resolution. Geometric resolution refers to the ability of the satellite 116 to effectively image a portion of the surface of the earth in a single pixel. The geometric resolution is typically expressed in terms of Ground sample distance (GSD). GSD is a term containing the overall optical and systemic noise sources and is useful for comparing how well one sensor can "see" an object on the ground within a single pixel. For example, the GSD can range from 0.41 meters to 30 meters depending on the ability of the satellite 116. For instance, if the GSD is 30 meters, then a single pixel within an image is approximately 30 meters by 30 meter square. The satellite 116 can be located in any orbit such as the low earth orbit, the polar orbit, and a geostationary orbit.

Figure 2:
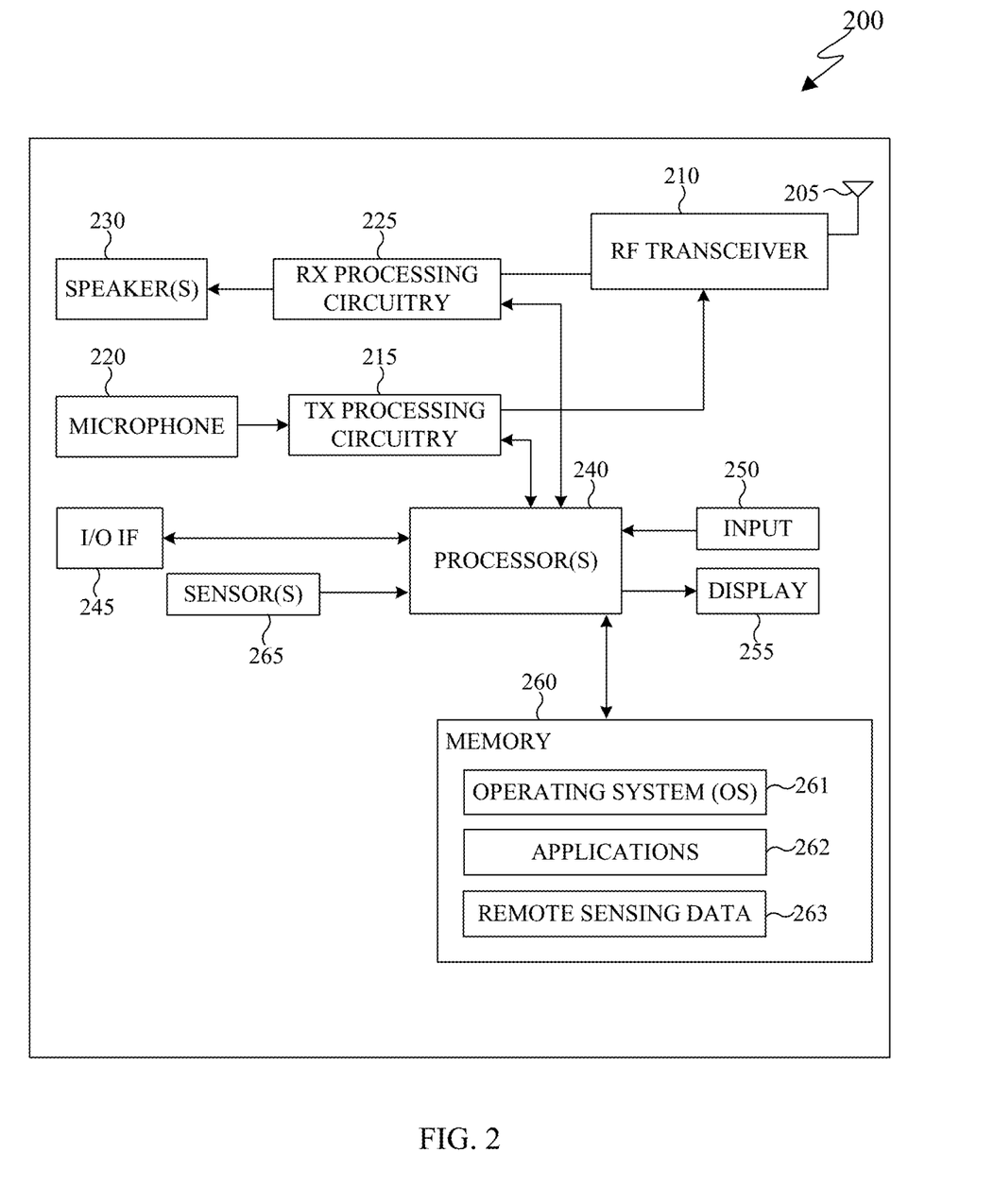
FIG. 2 illustrates an example electronic device in accordance with an embodiment of this disclosure.

FIG. 2 illustrates an electronic device, in accordance with an embodiment of this disclosure. The embodiment of the electronic device 200 shown in FIG. 2 is for illustration only and other embodiments can be used without departing from the scope of this disclosure. The electronic device 200 can come in a wide variety of configurations, and FIG. 2 does not limit the scope of this disclosure to any particular implementation of an electronic device. In certain embodiments, one or more of the devices 104-114 of FIG. 1 can include the same or similar configuration as electronic device 200.

In certain embodiments, the electronic device 200 is a computer similar to the desktop computer 106. In certain embodiments, the electronic device 200 is a server similar to the server 104. For example, the server 104 receives images from a satellite, such as the satellite 116, and the server 104 can process the images or the server 104 can transmit the images to another client device such as devices 106-114. In certain embodiments, the electronic device 200 is a computer (similar to the desktop computer 106 of FIG. 1), mobile device (similar to mobile device 108 of FIG. 1), a PDA (similar to the PDA 110 of FIG. 1), a laptop (similar to laptop computer 112 of FIG. 1), a tablet (similar to the tablet computer 114 of FIG. 1), and the like. In certain embodiments, electronic device 200 analyzes the received images and extracts information from the images. In certain embodiments, electronic device 200 can autonomously or near autonomously (i) search images for a specific object or type of object, (ii) identify infrastructure, and (iii) identify various change between images, or a combination thereof.

As shown in FIG. 2, the electronic device 200 includes an antenna 205, a radio frequency (RF) transceiver 210, transmit (TX) processing circuitry 215, a microphone 220, and receive (RX) processing circuitry 225. In certain embodiments, the RF transceiver 210 is a general communication interface and can include, for example, a RF transceiver, a BLUETOOTH transceiver, or a WI-FI transceiver ZIGBEE, infrared, and the like. The electronic device 200 also includes a speaker(s) 230, processor(s) 240, an input/output (I/O) interface (IF) 245, an input 250, a display 255, a memory 260, and sensor(s) 265. The memory 260 includes an operating system (OS) 261, one or more applications 262, and remote sensing data 263.

The RF transceiver 210 receives, from the antenna 205, an incoming RF signal such as a BLUETOOTH or WI-FI signal from an access point (such as a base station, WI-FI router, BLUETOOTH device) of a network (such as Wi-Fi, BLUETOOTH, cellular, 5G, LTE, LTE-A, WiMAX, or any other type of wireless network). The RF transceiver 210 down-converts the incoming RF signal to generate an intermediate frequency or baseband signal. The intermediate frequency or baseband signal is sent to the RX processing circuitry 225 that generates a processed baseband signal by filtering, decoding, or digitizing, or a combination thereof, the baseband or intermediate frequency signal. The RX processing circuitry 225 transmits the processed baseband signal to the speaker(s) 230, such as for voice data, or to the processor 240 for further processing, such as for web browsing data or image processing, or both. In certain embodiments, speaker(s) 230 includes one or more speakers.

The TX processing circuitry 215 receives analog or digital voice data from the microphone 220 or other outgoing baseband data from the processor 240. The outgoing baseband data can include web data, e-mail, or interactive video game data. The TX processing circuitry 215 encodes, multiplexes, digitizes, or a combination thereof, the outgoing baseband data to generate a processed baseband or intermediate frequency signal. The RF transceiver 210 receives the outgoing processed baseband or intermediate frequency signal from the TX processing circuitry 215 and up-converts the baseband or intermediate frequency signal to an RF signal that is transmitted via the antenna 205.

The processor 240 can include one or more processors or other processing devices and execute the OS 261 stored in the memory 260 in order to control the overall operation of the electronic device 200. For example, the processor 240 can control the reception of forward channel signals and the transmission of reverse channel signals by the RF transceiver 210, the RX processing circuitry 225, and the TX processing circuitry 215 in accordance with well-known principles. The processor 240 is also capable of executing other applications 262 resident in the memory 260, such as, one or more applications for machine learning, selecting a particular neural network, an application of a neural network, or a combination thereof. In certain embodiments, applications 262 also include one or more transform parameters used to transform and manipulate the images such as the remote sensing data 263. The processor 240 can include any suitable number(s) and type(s) of processors or other devices in any suitable arrangement. For example, the processor 240 is capable of natural langue processing, voice recognition processing, object recognition processing, and the like. In some embodiments, the processor 240 includes at least one microprocessor or microcontroller. Example types of processor 240 include microprocessors, microcontrollers, digital signal processors, field programmable gate arrays, application specific integrated circuits, and discrete circuitry. In certain embodiments, processor 240 can include neural network processing capabilities.

The processor 240 is also capable of executing other processes and programs resident in the memory 260, such as operations that receive, store, and timely instruct by selecting a neural network and extracting information from received image data. The processor 240 can move data into or out of the memory 260 as required by an executing process. In some embodiments, the processor 240 is configured to execute a plurality of applications 262 based on the OS 261 or in response to signals received from eNBs or an operator.

The processor 240 is also coupled to the I/O interface 245 that provides the electronic device 200 with the ability to connect to other devices such as the client devices 106-114. The I/O interface 245 is the communication path between these accessories and the processor 240

The processor 240 is also coupled to the input 250 and the display 255. The operator of the electronic device 200 can use the input 250 to enter data or inputs, or a combination thereof, into the electronic device 200. Input 250 can be a keyboard, touch screen, mouse, track ball or other device capable of acting as a user interface to allow a user in interact with electronic device 200. For example, the input 250 can include a touch panel, a (digital) pen sensor, a key, an ultrasonic input device, or an inertial motion sensor. The touch panel can recognize, for example, a touch input in at least one scheme along with a capacitive scheme, a pressure sensitive scheme, an infrared scheme, or an ultrasonic scheme. In the capacitive scheme, the input 250 is able to recognize a touch or proximity. Input 250 can be associated with sensor(s) 265, a camera, or a microphone, such as or similar to microphone 220, by providing additional input to processor 240. In certain embodiments, sensor 265 includes inertial sensors (such as, accelerometers, gyroscope, and magnetometer), optical sensors, motion sensors, cameras, pressure sensors, heart rate sensors, altimeter, and the like. The input 250 also can include a control circuit.

The display 255 can be a liquid crystal display, light-emitting diode (LED) display, organic LED (OLED), active matrix OLED (AMOLED), or other display capable of rendering text and graphics, such as from websites, videos, games and images, and the like. Display 255 can be sized to fit within a head-mounted display (HMD). Display 255 can be a singular display screen or multiple display screens for stereoscopic display. In certain embodiments, display 255 is a heads up display (HUD).

The memory 260 is coupled to the processor 240. Part of the memory 260 can include a random access memory (RAM), and another part of the memory 260 can include a Flash memory or other read-only memory (ROM).

The memory 260 can include persistent storage (not shown) that represents any structure(s) capable of storing and facilitating retrieval of information (such as data, program code, or other suitable information on a temporary or permanent basis). The memory 260 can contain one or more components or devices supporting longer-term storage of data, such as a ready only memory, hard drive, flash memory, or optical disc. The memory 260 also can contain remote sensing data. Remote sensing data 263 includes data such as color images, black and white images, RADAR, LIDAR, thermal imagery, infrared imagery, hyperspectral data, and the like. Remote sensing data can be received from one or more information repositories, servers, databases, or directly from an aerial vehicle such as a satellite (similar to satellite 116 of FIG. 1) a drone, an aircraft and the like. The remote sensing data can include metadata that can indicate the capturing source of the data, the geographical location of the data, resolution, sensor type, and the like.

Electronic device 200 further includes one or more sensor(s) 265 that are able to meter a physical quantity or detect an activation state of the electronic device 200 and convert metered or detected information into an electrical signal. In certain embodiments, sensor 265 includes inertial sensors (such as accelerometers, gyroscopes, and magnetometers), optical sensors, motion sensors, cameras, pressure sensors, heart rate sensors, altimeter, breath sensors (such as microphone 220), and the like. For example, sensor(s) 265 can include one or more buttons for touch input (such as on the headset or the electronic device 200), a camera, a gesture sensor, a gyroscope or gyro sensor, an air pressure sensor, a magnetic sensor or magnetometer, an acceleration sensor or accelerometer, a grip sensor, a proximity sensor, a color sensor, a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an Infrared (IR) sensor, an ultrasound sensor, an iris sensor, a fingerprint sensor, and the like. The sensor(s) 265 can also include an hyperspectral sensor. The sensor(s) 265 can further include a control circuit for controlling at least one of the sensors included therein. The sensor(s) 265 can be used to determine an orientation and facing direction, as well as geographic location of the electronic device 200. Any of these sensor(s) 265 can be disposed within the electronic device 200.

Although FIG. 2 illustrates one example of electronic device 200, various changes can be made to FIG. 2. For example, various components in FIG. 2 can be combined, further subdivided, or omitted and additional components can be added according to particular needs. As a particular example, the processor 240 can be divided into multiple processors, such as one or more central processing units (CPUs), one or more graphics processing units (GPUs), one or more an eye tracking processors, and the like. Also, while FIG. 2 illustrates the electronic device 200 configured as a mobile telephone, tablet, smartphone, the electronic device 200 can be configured to operate as other types of mobile or stationary devices, including a system such as server 104.

Figure 3:
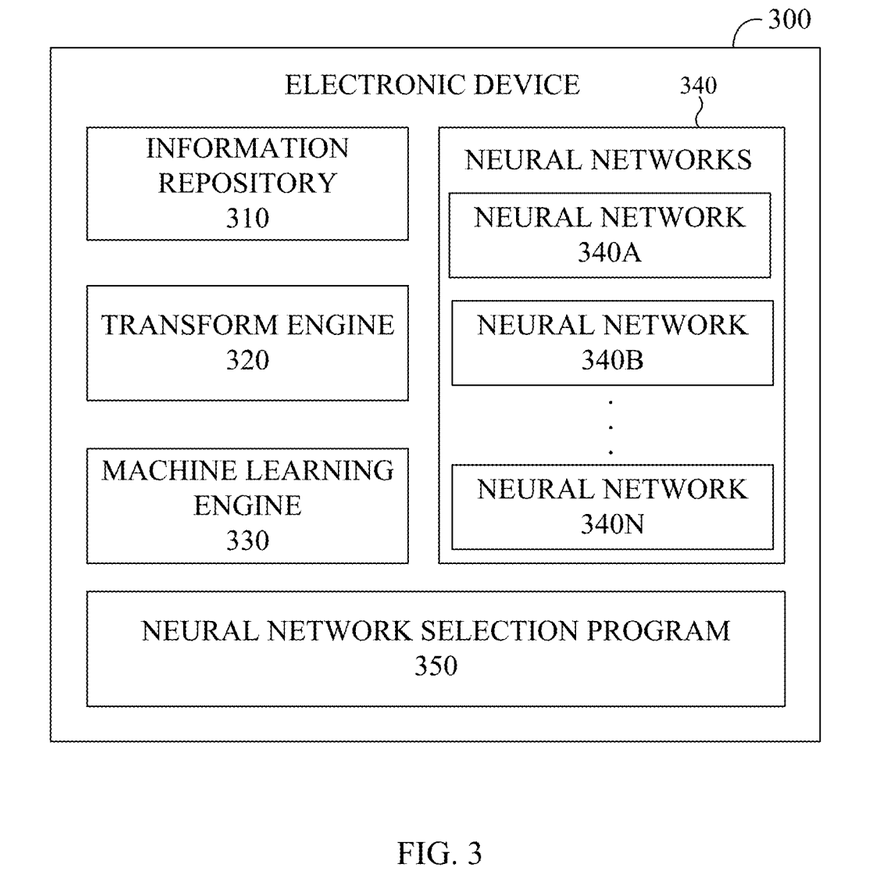
FIG. 3 illustrates an example block diagram in accordance with an embodiment of this disclosure.

FIG. 3 illustrates a block diagram of an electronic device 300, in accordance with an embodiment of this disclosure. The embodiment of the electronic device 300 shown in FIG. 3 is for illustration only. Other embodiments could be used without departing from the scope of the present disclosure.

Electronic device 300 illustrates a high-level architecture, in accordance with an embodiment of this disclosure. Electronic device 300 processes and extracts data from remote sensing imagery, automatically or in a semi-supervised framework. Electronic device 300 can analyze input data and select a particular neural network to extract particular results from the input data. Since neural networks need extensive training to produce specific results, by analyzing the input data to identify various parameters and objects allows the electronic device to select a particular neural network to achieve a desired result. In certain embodiments, electronic device 300 provides a semi-supervised neural network system that is adaptive to process various remote sensing input data across geographic regions, where the remote sensing input data includes various content. For example, the image input data is wavelength agnostic such that electronic device can process images in the visual spectrum as well as images originating from other wavelengths as well. Electronic device 300 includes information repository 310, transform engine 320, machine learning engine 330, neural networks 340, and neural network selection program 350. Neural networks 340 includes two or more neural networks such as neural networks 340A, neural networks 340B, through neural networks 340N (collectively referred to as neural networks 340A-N).

Electronic device 300 can be configured similar to server 104 of FIG. 1, any of the one or more client devices 106-114 of FIG. 1, and can include internal components similar to that of electronic device 200 of FIG. 2. For example, electronic device 300 can be a computer (similar to the desktop computer 106 of FIG. 1), a mobile device (similar to the mobile device 108 and the PDA 110 of FIG. 1), a laptop computer (similar to the laptop computer 112 of FIG. 1), a tablet computer (similar to the tablet computer 114 of FIG. 1), and the like. In certain embodiments, the electronic device 300 can be multiple computing devices connected over a medium such as a network (similar to network 102 of FIG. 1). For example, each neural network (neural network 340A, neural network 340B) can be located on separate computing devices.

Information repository 310 can be similar to memory 260 of FIG. 2. In certain embodiments, information repository 310 is similar to remote sensing data 263 of FIG. 2. Information repository 310 can store one or more images. In certain embodiments, images can include various types of remote sensing such as spatial, spectral, temporal, and radiometric. In certain embodiments, images can include images captured by a variety of wavelengths, such as radio waves, microwaves (such as RADAR), infrared waves (such as thermal imagery), the visible spectrum (such as color and black and white images), ultraviolet waves, X-rays, gamma rays, magnetism, and the like. In certain embodiments, images can include images generated by hyperspectral imaging. In certain embodiments, images can include images generated by radio frequency imaging. In certain embodiments, the images include heterogeneous image data set. Data stored in information repository 310 includes various images originally captured from various aerial vehicles. Information repository 310 can maintain metadata associated with each image. In certain embodiments, the metadata can indicate the capturing source of the data, the geographical location of the data, resolution, sensor type, and the like. In certain embodiments, the electronic device can generate additional metadata that statistically describes the received image data. The generated metadata can also be maintained in the information repository 310.

In certain embodiments, remote sensing data within the information repository 310 include a set of aerial images. The aerial images can be captured from a satellite as the satellite passes over a position of the earth. The aerial images can be captured from an aerial vehicle such as a drone or airplane or both, as the aerial vehicle passes over a position of the earth. The remote sensing data can include color images, and black and white images. The remote sensing data can comprise images originating from one or more radio frequency bands. The remote sensing data has a resolution that defines the clarity and details of the content of the image. The remote sensing data can also include a histogram that provides details of the image.

Transform engine 320 analyzes the image using one or more transforms to extract data from the image. In certain embodiments, the transform engine 320 utilizes image frequency transformations such as the Discrete Cosine Transform (DCT), Hadamard Transform, Fourier Transform, and the like. In certain embodiments, the transform engine 320 utilizes texture analysis. In certain embodiments, the transform engine 320 reduces ground truth data requirements for later processing, such as machine learning or processing by a neural network, or both.

The DCT represents an image as a sum of sinusoids of varying magnitudes and frequencies. In certain embodiments, the DCT separates an image into parts of differing importance. The DCT is similar to a Fourier Transform that decomposes a function of time, such as a signal into various frequencies. Similarly, the Hadamard Transform is a class of Fourier Transform. In certain embodiments, the output of the transform can be a frequency domain while the input image is in the spatial domain. A Fourier Transform is utilized to access geometric characteristics of a spatial domain image. In certain embodiments, a correlation is created between an image that results from a frequency transform and parameters associated with a neural network. For example, the correlation can include convolution kernel size, number of layers, stride, and the like. The transform engine 320 deconstructs an image or a set of images. In certain embodiments, the transform engine 320 deconstructs an image in order to generate metadata that can describe the image as well.

In certain embodiments, the transform engine 320 reduces the requirements of ground truth when the images are presented to at least one of the neural networks 340. For example, by manipulating the image by one or more transforms, various data can be extracted. In another example, by manipulating the image by one or more transforms, a texture analysis of the remote sensing data can be performed. A texture analysis can be performed using various frequency transoms such as DCT, a Fourier transform, and Hadamard in order to capture various characteristics of the texture that repeats. In certain embodiments, the Fourier Transform is a Fast Fourier Transform (FFT). In certain embodiments, following the various frequency transforms a clustering algorithm is applied to the remote sensing data (such as an image) to classify the various textures. For example, the algorithm used to classify the various textures is a neural network such as one of the neural networks 340. In another example, the neural network 340A can classify the remote sensing data following the transform based on a describing texture technique such as a bubbly, a lined, a checkered, and the like. In certain embodiments, the transform engine 320 performs a texture analysis to provide pre-processing image segmentation, ground truth, accelerated neural network training, and the like.

The machine learning engine 330 analyzes the image to provide an initial assessment of the image. The machine learning engine 330 is provided the results from the transform engine 320. The machine learning engine 330 detects metadata associated with the image as well as features of the image itself. The machine learning engine 330 makes simple and quick decisions that identify one or more features of the image. Stated differently, the machine learning engine 330 detects and identifies objects in the image without any ground truth data of the image. In certain embodiments, the machine learning engine 330 can predict features within the image.

The machine learning engine 330 analyzes the image and generates metadata that describes the image. The generated metadata that describes the image can include coefficients and statistics. In certain embodiments, the machine learning engine 330 utilizes computer vision to extract information about one or more objects within the image or one or more aspects about the image. For example, machine learning engine 330 identifies objects within the image using object recognition processing. In certain embodiments, the machine learning engine 330 generates at least one prediction as to the content within the image. The prediction can be used by the neural network selection program 350 to select a particular neural network.

In certain embodiments, the machine learning engine 330 is unsupervised, in that no ground truth is provided to the machine learning engine 330 as to what objects might be in the image. For example, if the image is an aerial view of an ocean, the machine learning engine 330 determines whether the image is of the ocean based on metadata associated with the image or from the image transform. The machine learning engine 330 can determines that the image is blank. That is the, image is unrecognizable by the machine learning engine 330. The machine learning engine 330 can determine that the image is of the sky taken from the surface of the earth looking upwards. That is the image appears to be the sky. For example, the machine learning engine 330 can interpret the uniform color of the ocean and white waves as the sky with clouds. The machine learning engine 330 can determine that the image is of the ocean. In certain embodiments, the machine learning engine 330 can determine the exact location on earth that the image is of, based on metadata associated with the image when the image was captured, such as geospatial location. Regardless of the outcome of the decision, the machine learning engine 330 makes one or more decisions about the image itself without input as to what the image contains.

In another example, if the inputted image is an aerial view of an area of land, the machine learning engine 330 attempts to derive information about the image. The machine learning engine 330 can identify that the image is of an aerial view of a city. The machine learning engine 330 can identify features of the environment, such as rivers, lakes, streams, mountains, deserts, and the like. The machine learning engine 330 can identify approximate ground temperature if the image includes thermal imaging. The machine learning engine 330 can identify vegetation. For example, the machine learning engine 330 can identify vegetation based on the colors of the image. For instance, if the color green is prevalent, then the machine learning engine 330 can identify features of vegetation, by associating the color green with vegetation.

Neural networks 340 is a repository of two or more neural networks, such as neural network 340A, neural network 340B, through neural network 340N. In certain embodiments, each neural network 340A-N is a convolutional neural network. A convolutional neural network is made up of neurons that have learnable weights and biases. Each neuron receives an input and performs a decision. A convolutional neural network makes an explicit decision that any input is an image. For example, the architecture of each neural network 340A-N is arranged in three-dimensions, such that each neural network 340A-N is a volume.

In certain embodiments, each neural network 340A-N is a generalized neural network that is pre-trained. For example, each neural network 340A-N is pre-trained and specialized to perform a particular task based on a given input. The more training each neural network 340A-N undergoes the more accurate the results are. It is noted that the more training each neural network 340A-N undergoes the narrower the field of analysis is. For example, neural networks 340A-N can be pre-trained to identify infrastructure of a city. For instance, neural network 340A can detect and identify industrial buildings within a city. Similarly, neural network 340B can detect and identify residential houses within a city. Neural network 340B can be trained to identify residential and industrial buildings. For example, to identify and distinguish between residential and industrial buildings, neural network 340B can identify the roof type or the roof shape.

In another example, each neural network 340A-N can be pre-trained to identify changes to a city's infrastructure over a period. For instance, neural network 340A can be pre-trained to identify buildings that change over a period of time. Similarly, neural network 340B can be pre-trained to identify changes to water location within a city. Changes in water location can be useful in order to detect if flooding that occurred and if so locations as to where water has encroached into the city. Similarly, neural network 340C can be pre-trained to identify changes to roads. Changes to roads can be useful in detecting damage after a natural disaster to plan ingress and egress to areas of the city.

In another example, each neural network 340A-N can be pre-trained to identify certain material within an image. For instance, the neural network 340A can be trained to identify aluminum within an image. Similarly, neural network 340B can be pre-trained to identify areas of water and areas of non-water within an image.

Neural network selection program 350 selects a particular neural network to perform a given task based on the input data within the information repository 310. Since each neural network 340A-N is designed to perform specific tasks, the neural network selection program 350 can select a neural network to perform a given task, based on generated data from the transform and the machine learning as well as metadata that is included with the image itself.

In certain embodiments, the neural network selection program 350 analyzes the generated metadata from the machine learning engine 330 that identified various features in the image. Based on the identified features, the neural network selection program 350 can select a particular neural network such as neural network 340A-N to perform and extract information from the image.

In certain embodiments, neural network selection program 350 analyzes the generated metadata from the machine learning engine 330 to identify features within the remote sensed data. Based on the identified features, the neural network selection program 350 can select a particular neural network from the neural networks 340 based on the identified features of the remote sensed data. The neural network selection program 350 selects a particular neural network from the neural networks 340 that is trained to analyze features of the image. Since the transform engine 320 removes an element of ground truth, and the machine learning engine 330 identifies features of the image, the neural network selection program 350 can autonomously or near autonomously select a particular neural network from the neural networks 340 to perform the analysis on the image. In certain embodiments, the features of the image that the neural network selection program 350 identifies and analyzes when selecting a particular neural network includes an identified object of the image by the machine learning engine 330.

In certain embodiments, the features of the image that the neural network selection program 350 identifies and analyzes when selecting a particular neural network includes metadata generated when the remote sensing data was captured. For example, the geospatial location of the remote sensed data can include the location on earth of where the image is located. The location of the captured data can indicate whether the image is of a city, farm land, an urban area, a rural area, a city in a first world country, a city in a third world country, a body of water, a natural landmark, a desert, a jungle, and the like. If the geospatial location of the image indicates a city, the geospatial location can provide the neural network selection program 350 the name of the city, the age of the city, country the city is located in and the like. Such information can provide an indication of common building materials of the city and an estimation of the city layout, in order for the neural network selection program 350 to select a trained neural network that specializes in analyzing the remote sensed data of the sort. For example, a newer city may have a grid like pattern and use particular materials for the roofs and various city infrastructure buildings. In another example, an older city may follow a natural feature such as a river that prohibits a grid like city structure. Additionally, older cities may use older materials for roofs, and infrastructure. In certain embodiments, the neural network selection program 350 can utilize the generated metadata from the machine learning engine 330 to sub-classify a city. For example, the city can be sub-classified into a town, a metro area, rural area, suburban area as well as include a differentiation between industrial and residential buildings. In another example, the areas city can be sub-classified into construction, demolition and the like.

For example, if the task assigned to a neural network is to detect change of an infrastructure such as damage caused by a natural disaster, by identifying the type of content within the remote sensed data the neural network selection program 350 can select a neural network that is trained to detect damage. For instance, if the geospatial location indicates that an image is of a city, then a particular neural network can be selected that distinguishes from construction and damage. In another instance, if the geospatial location indicates that the image is of a rural area, then a particular neural network can be selected that distinguishes from farmland and damage.

If the geospatial location of the remote sensed data can indicate a body of water, the geospatial location can provide the neural network selection program 350 as to the type of water (an ocean, a sea, a lake, a river, and the like). The geospatial location that indicates a body of water can also indicate whether the water is sea water, brackish water, or fresh water. The geospatial location can also indicate whether land masses are near the body of water. For example, if the geospatial location of the remote sensed data does not have a landmass in proximity, the neural network selection program 350 can select a neural network that analyzes for particular structures, shapes, materials. For instance, if the task presented to the neural network selection program 350 is to find a particular shape or material, such as debris from an airplane or boat that crashed in the body of water, then the neural network selection program 350 selects a particular neural network that is trained to detect particular shapes or materials.

In certain embodiments, the features of the image that the neural network selection program 350 identifies and analyzes when selecting a particular neural network includes one or more parameters associated with the machine learning engine 330. The parameters associated with the machine learning engine 330 can include a clustering methodology, as well as number of clusters. Clustering methodology can include K means and principal component analysis (PCA). K-means is a non-parametric method that can be used in classification and regression modeling.

In certain embodiments, the features of the image that the neural network selection engine program identifies and analyzes when selecting a particular neural network includes the manipulated remote sensed data from the image transform engine 320. In certain embodiments, the features of the remote sensed data that the neural network selection program 350 identifies and analyzes when selecting a particular neural network includes the remote sensed data prior to the manipulation by the transform engine 320. For example, the neural network selection program 350 can receive the manipulated remote sensed data or the original remote sensed data, or a combination thereof. When the neural network selection program 350 receives and analyzes the manipulated remote sensed data, various hidden features of the remote sensed data are revealed and allow the neural network selection program 350 to select a particular neural network that is trained to handle the particular remote sensed data. For example, the neural network selection program 350 can associate the particular transform used, the extract data from the transform, a convolutional kernel size, a number of layers, the stride of each of the neural networks 340, in selecting a particular neural network.

Figure 4A:
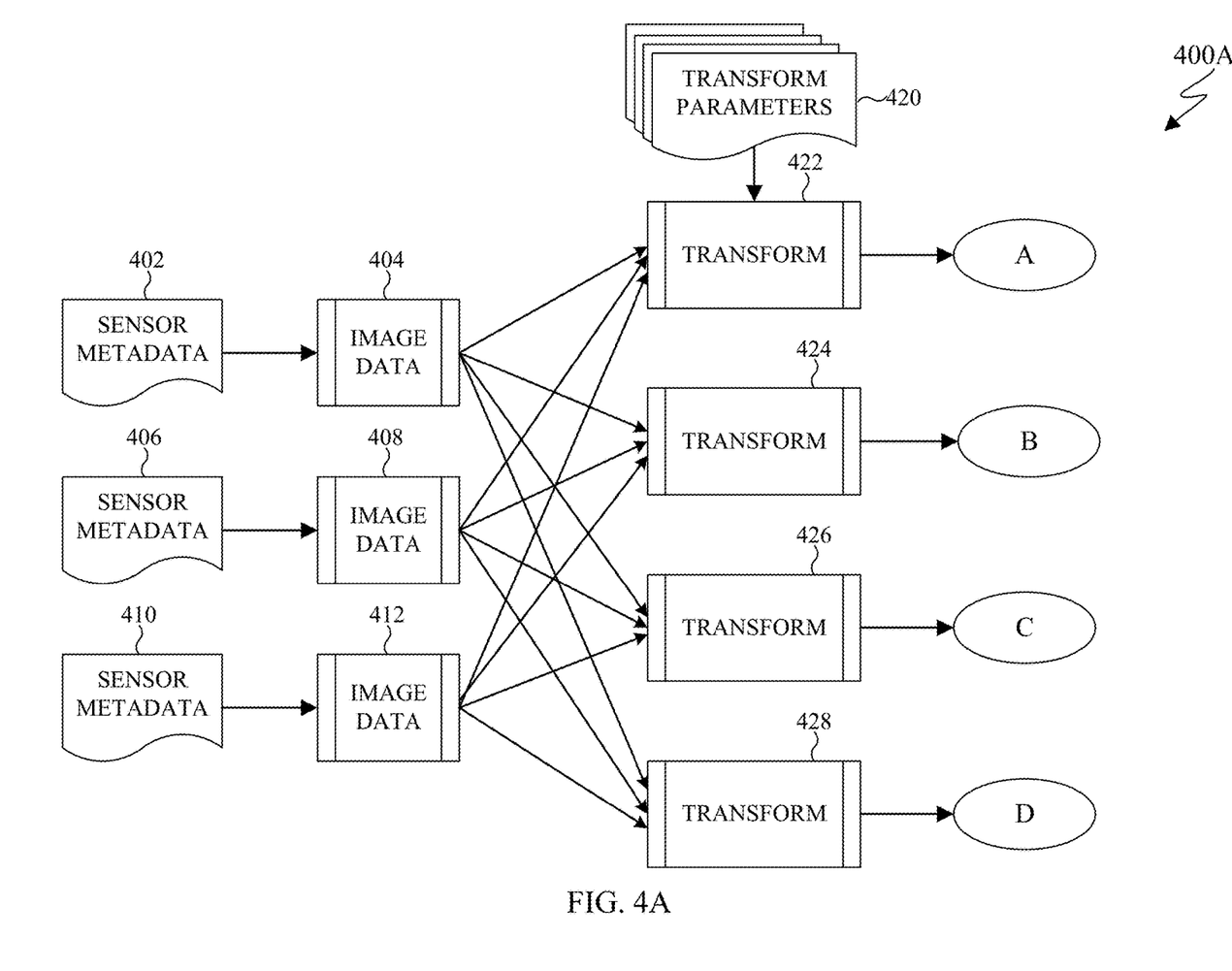
FIGS. 4A-4B illustrate an example neural network selection process in accordance with an embodiment of this disclosure.
Figure 4B:
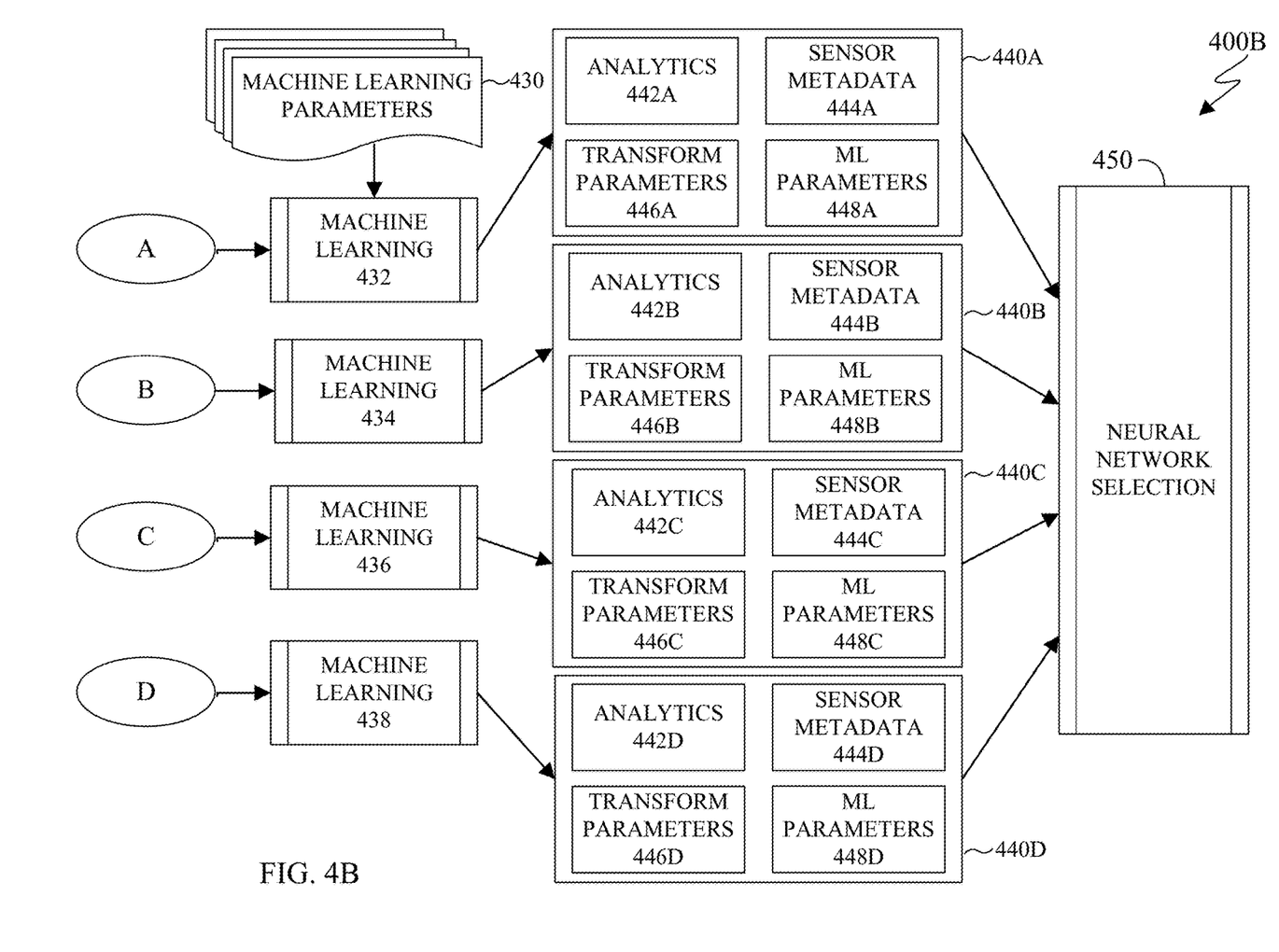

FIGS. 4A-4B illustrate an example neural network selection process in accordance with an embodiment of this disclosure. FIGS. 4A and 4B illustrate environment 400A and 400B, respectively, depicting a neural network selection. FIG. 4B is a continuation of FIG. 4A. The embodiments of the environment 400A and 400B shown in FIGS. 4A and 4B are for illustration only. Other embodiments could be used without departing from the scope of the present disclosure.

Sensor metadata 402 of FIG. 4A is metadata that indicates various aspects of the image data 404. Similarly, sensor metadata 406 of FIG. 4A is metadata that indicates various aspects of the image data 408. Metadata 410 of FIG. 4A is metadata that indicates various aspects of the image data 412. The sensor metadata 402, 406, and 410 includes metadata of the capturing source of the image data 404, 408, and 412 respectively. The sensor metadata 402, 406, and 410 can include the geographical location of the data, resolution, sensor type, type of sensor, the mode of acquisition (satellite, type of aerial vehicle and the like), to name a few. The image data 404, 408, and 412 can be remote sensing data. The image data 404, 408, and 412 can be from the same source or different sources. The image data 404, 408, and 412 can each be one or more aerial image(s) of various locations of the earth. For example, image data 404 can be of a city, image data 408 can be image data taken of a particular ocean, and image data 412 can be an image of a desert. In another example, image data 404, 408, and 412 can be of the same location on earth, such as a particular city taken at various time intervals. In another example, image data 404, 408, and 412 can be a hyperspectral image, that includes information across the electromagnetic spectrum.

Each respective image data is manipulated by a transform such as transform 422, 424, 426, and 428. Transform parameters 420 as well as transforms 422, 424, 426, and 428 are similar to the transform engine 320 of FIG. 3. In certain embodiments, transform 422 is applied to image data 404, 408, and 412. Transform parameters 420 include can include a kernel size, a stride, a transform type, or a combination thereof. The transform type can include a discrete cosine transform, a local binary pattern transform, a Fourier Transform, and the like. The local binary pattern transform is a type of visual descriptor used for classification in computer vision. That is, the local binary pattern transform is a texture spectrum model for texture classification of images via remote sensed data. In certain embodiments, the local binary pattern transform can be combined with the histogram of oriented gradations to improve the classification. In certain embodiments, each image data 404, 408, and 412 are not limited to only the transforms of 422, 424, 426, and 428. Rather, any number of transforms can be applied to each image. That is, more transforms (not shown) as well as less transforms can be applied to each image such as image data 404, 408, and 412.

Once an image data passes through a transform (such as transform 422, 424, 426, and 428) on environment 400A, the transformed image data is transmitted to a machine learning 432, 434, 436, and 438 of environment 400B, respectively. That is, image data 404 can pass through any number of transforms (such as transform 422, 424, 426, and 428) on environment 400A and then each transformed version of image data 404 is passed to the machine learning 432, 434, 436, and 438 of environment 400B, respectively. Machine learning parameters 430 as well as machine learning 432, 434, 436, and 438 are similar to the machine learning engine 330 of FIG. 3.

In certain embodiments, when more or less transforms are present, a respective number of machine learning 432, 434, 436, and 438 are present. For example, when more transforms are present, more machine learnings are present.

In certain embodiments, the machine learning parameters 430 can include various clustering methodologies such as K-means and PCA. In certain embodiments, the machine learning parameters 430 can also include a number of clusters. In certain embodiments, the machine learning parameters 430 detect patterns within the image in order to predict the content of the image. For example, each machine learning 432, 434, 436, 438 can analyze the same image that was manipulated by a transform (such as transform 422, 424, 426, and 428) in order to extract various patterns of the image.

Analyzer 440A, 440B, 440C, and 440D analyzes the results of the machine learning 432, 434, 436, and 438 respectively. Analyzer 440A includes analytics 442A, sensor metadata 444A, transform parameters 446A, and machine learning parameters 448A. Similarly, analyzer 440B includes analytics 442B, sensor metadata 444B, transform parameters 446B, and machine learning parameters 448B. Similarly, analyzer 440C includes analytics 442C, sensor metadata 444C, transform parameters 446C, and machine learning parameters 448C. Similarly, analyzer 440D includes analytics 442D, sensor metadata 444D, transform parameters 446D, and machine learning parameters 448D. Analytics 442A, 442B, 442C, and 442D are similar. Sensor metadata 444A, 444B, 444C, and 444D are similar. Transform parameters 446A, 446B, 446C, and 446D are similar. Machine learning parameters 448A, 448B, 448C, and 448D are similar.

Analytics 442A, 442B, 442C, and 442D can include various features of the image data as derived by the machine learning 432, 434, 436, and 438, respectively. For example, analytics 442A, 442B, 442C, and 442D can include buildings, roads, infrastructure, and the like. In another example, analytics 442A, 442B, 442C, and 442D can include analyzing different time stamps of the image to detect change.

Sensor metadata 444A, 444B, 444C, and 444D is similar to the sensor metadata 402, 406, or 410. For example, sensor metadata 444A is the sensor metadata 402, 406, or 410 that is associated with the image that was received by machine learning 432. The image that was received by machine learning 432 can be image data 404, 408, or 412. The sensor metadata 444A, 444B, 444C, and 444D can include a satellite image source, a resolution, a sensor type and the like.

Transform parameters 446A, 446B, 446C, and 446D are similar to the transform parameters 420. Transform parameters 446A, 446B, 446C, and 446D analyze the kernel size, stride, and the transform type (such as discrete cosine transform, a local binary pattern transform, a Fourier Transform, and the like).

Machine learning parameters 448A, 448B, 448C, and 448D are similar to the machine learning parameters 430. Machine learning parameters 448A, 448B, 448C, and 448D analyze the clustering methodology (such as K-means, PCA and the like) and the number of clusters.

Analyzer 440A, 440B, 440C, and 440D analyzes the input data from each element and the information is passed to the neural network selection 450. Neural network selection 450 is similar to the neural network selection program 350 of FIG. 3. The neural network selection 450 selects a particular neural network to perform the analysis on the received image data 404, 408, or 412.

Figure 5:
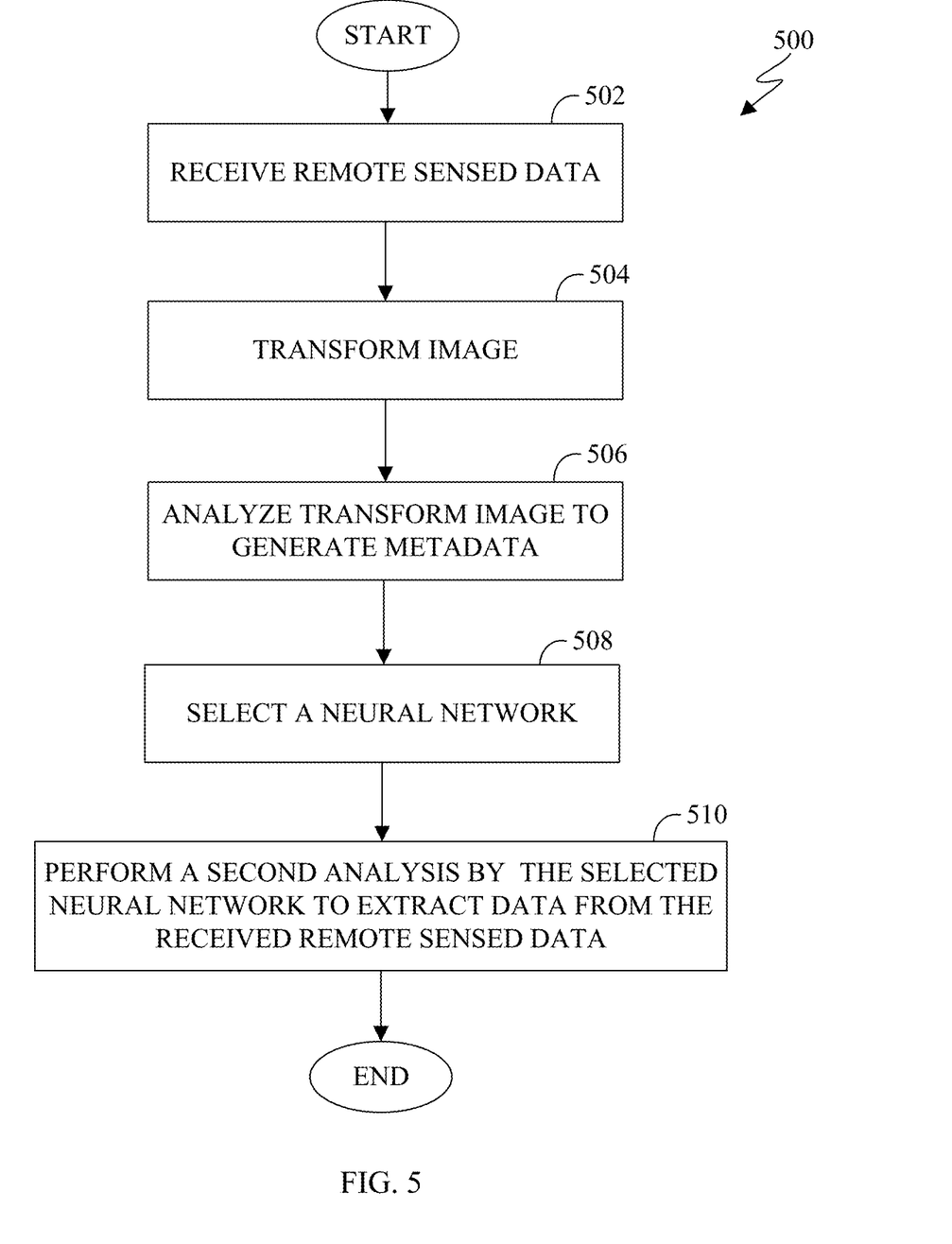
FIG. 5 illustrates a method for selecting a neural network in order to extract particular results from images in accordance with an embodiment of this disclosure.

FIG. 5 illustrates a method for selecting a neural network in order to extract particular results from images in accordance with an embodiment of this disclosure. FIG. 5 does not limit the scope of this disclosure to any particular embodiments. While process 500 depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps.

For ease of explanation, the method of selecting a particular neural network is performed with respect to the server 104 of FIG. 1, any of the client devices 106-114 of FIG. 1, the electronic device 200 of FIG. 2, or the electronic device 300 of FIG. 3. However, the process 500 can be used with any other suitable system, or a combination of systems.

In block 502 the electronic device receives remote sensed data. The remote sensed data can be received from an aerial vehicle or a satellite. The remote sensed data can include an image. The remote sensed data can include a set of images. The remote sensed data can be aerial images. In certain embodiments, the remote sensed data can include a color image, or a black and white image. In certain embodiments, the remote sensed data can be captured based on at least one radio frequency bands that include visible and non-visible bands. The remote sensed data can also include a resolution and histogram.

In block 504 the electronic device transforms the remote sensed data. The transform can include at least one signal processing transform such as a Fourier Transform, a Discrete Cosine Transform, a Hadamard Transform, and the like. By processing the image with a transform, various aspects of necessary ground truth of the image can be reduced.

In block 506 the electronic device analyzes the transformed image in order to generate metadata. In certain embodiments, the analysis of the transformed image is performed by machine learning. In certain embodiments, the machine learning is unsupervised. The generated metadata statistically describes the received remote sensed data. In certain embodiments, the analysis of the transform image is performed by a machine learning engine, similar to the machine learning engine 330 of FIG. 3. The analysis of the transformed image provides a prediction as to the content in the image.

In block 508 the electronic device selects a particular neural network to perform a second analysis of the received remote sensed data. In certain embodiments, the selection of a particular neural network is based on the generated metadata from block 506. The selecting of a particular neural network can be based on various metadata received with the remote sensed data, transform parameters, machine learning parameters, as well as analytics. The metadata that is received with the remote sensed data can include generated data that indicates parameters of the sensor's capability when the remote sensed data was acquired, such as a geospatial location of the content of remote sensed data, a listing of the radio frequency bands within the remote sensed data, a resolution, a histogram and the like. In certain embodiments, the selection of a particular neural network is based on an identified object based on the analysis of block 506. In certain embodiments, the selection of a particular neural network is based on various machine learning parameters. In certain embodiments, the selection of a particular neural network is based on the manipulated image data from block 504.

In block 510 the electronic device performs a second analysis by the selected neural network of block 508. The second analysis is performed to extract data from the received remote sensed data. The second analysis can include loss data that is domain specialized. In certain embodiments, the loss data is based on prior approaches to semantic segmentation.

The second analysis detects and classifies various aspects of the content within the remote sensed data. For example, the second analysis detects infrastructure of an area. In another example, the second analysis can perform a change detection of the infrastructure of the area.

In certain embodiments, the extract data can be compared to the generated metadata from block 506. Based on the comparison, the results can be input into the selected neural network to improve the training of the neural network. For example, particular neural network was selected (block 508) based in part on the predicted results of the first analysis (block 506). If the predictions from block 506 are not accurate, the selected neural network can be trained to accommodate the inaccurate prediction to improve the results generated by the selected neural network. Similarly, if the predictions from block 506 are accurate, then the selected neural network can be trained to improve the results as well as trained to skip portions of the processing to increase speed and efficiency.

In certain embodiments, process 500 initially processes the input data using unsupervised image processing and remote sensing techniques. Image processing and remote sensing techniques can include Discrete Cosine Transform to reduce ground truth requirements, accelerate training, improve performance for the selected use case by implicating certain pertained models as ideal candidates by narrowing the number of neural networks, or a combination thereof. A domain specialized loss function can be implemented based on prior approaches in order to perform semantic segmentation to increase prediction confidence by a machine learning, or increase the learning rate of each neural network, or a combination thereof. By using selection of generalized neural networks that can leverage various pre-trained models to transfer learning to scale the inference of multiple resolutions of imagery and remote sensing data from different types of sensors, allows various neural networks to be adapted to the input data. Similarly, the neural networks can be selected based on the input data to provide a neural network system than can scale and process a variety of input data sources with limited ground truth availability. In certain embodiments, the various neural networks are convolutional neural networks with the capability of extracting features from remote sensed data and imagery. For example, the selection and initialization of one or more neural networks is tailored to the specific input and a desired outcome.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the applicants to refer to structures known to those skilled in the relevant art and is not intended to invoke 35 U.S.C. § 112(f).

Although the present disclosure has been described with exemplary embodiments, various changes and modifications may be suggested to one skilled in the art. It is intended that the present disclosure encompass such changes and modifications as fall within the scope of the appended claims.

What is claimed is:

1. A computer-implemented method comprising:
receiving image data and corresponding metadata;
manipulating the received image data based on a set of transform parameters;
analyzing the manipulated image data, without using ground truth data, to generate metadata predictive of content in the received image data;
analyzing the corresponding metadata and the generated metadata to identify one or more features of the received image data;
selecting, based on the identified one or more features, a neural network from a plurality of pre-trained neural networks; and then
analyzing the received image data using the selected neural network to extract information from the received image data.

2. The method of claim 1, further comprising:
predicting features of the received image data based on the analysis of the manipulated image data;
comparing the extracted information to the predicted features; and
adjusting the selected neural network when the predicted features and the extracted information exceed a threshold.

3. The method of claim 1, wherein the set of transform parameters include at least one signal processing transform, an image processing transform, Fourier transform, and remote sensing, wherein the remote sensing includes a discrete cosine transform.

4. The method of claim 1, wherein manipulated image further comprises performing remote sensing of the received image data to reduce ground truth data to select the neural network.

5. The method of claim 1, wherein analyzing the manipulated image data is based on unsupervised machine learning.

6. The method of claim 1, wherein selecting the neural network from the plurality of neural networks comprises:
analyzing the generated metadata to identify features within the received image data; and
selecting the neural network based on the identified features of the image data,
wherein the features include at least one of an identifying an object within the received image data, sensor metadata included in the received image data, machine learning parameters, and the manipulated image data based on the set of transform parameters.

7. The method of claim 1, wherein performing the second analysis includes loss data, wherein the loss data is domain specialized and based on prior approaches to semantic segmentation.

8. The method of claim 1, wherein performing the second analysis by the neural network comprises:
detecting and classifying the information within the received image data;
identifying whether the received image data includes building infrastructure of a geographic area; and
monitoring the building infrastructure to detect whether a change of the building infrastructure occurred during a period of time.

9. The method of claim 1, wherein performing the second analysis by the neural network comprises:
  detecting and classifying the information within the received image data; and
  identifying whether the received image data includes a particular object wherein the particular object can be based on at least one of a certain shape, a certain material, and a certain substance.

10. The method of claim 1, wherein the received image data comprises heterogeneous image data and includes a set of aerial images.

11. The method of claim 1, wherein the received image data includes at least one of color, at least one radio frequency band, a resolution, or a histogram.

12. An electronic device comprising:
  an I/O interface configured to receive image data and corresponding metadata; and
  a processor operably coupled to the I/O interface, wherein the processor is configured to:
    manipulate the received image data based on a set of transform parameters;
    analyze the manipulated image data, without using ground truth data, to generate metadata predictive of content in the received image data;
    analyze the corresponding metadata and the generated metadata to identify one or more features of the received image data;
    select, based on the identified one or more features, a neural network from a plurality of pre-trained neural networks; and then
  analyze perform a second analysis of the received image data using the selected neural network to extract information from the received image data.

13. The electronic device of claim 12, wherein the processor is further configured to:
  predict features of the received image data based on the analysis of the manipulated image data;
  compare the extracted information to the predicted features; and
  adjust the selected neural network when the predicted features and the extracted information exceed a threshold.

14. The electronic device of claim 12, wherein the set of transform parameters include at least one signal processing transform, an image processing transform, Fourier transform, and remote sensing, wherein the remote sensing includes a discrete cosine transform.

15. The electronic device of claim 12, wherein to select the neural network from the plurality of neural networks, the processor is further configured to:
  analyze the generated metadata to identify features within the received image data; and
  select the neural network based on the identified features of the image data,
  wherein the features include at least one of an identifying an object within the received image data, sensor metadata included in the received image data, machine learning parameters, and the manipulated image data based on the set of transform parameters.

16. The electronic device of claim 12, wherein performing the second analysis by the neural network the processor is further configured to:
  detect and classify the information within the received image data;
  identify whether the received image data includes building infrastructure of a geographic area; and
  monitor the building infrastructure to detect whether a change of the building infrastructure occurred during a period of time.

17. The electronic device of claim 12, wherein performing the second analysis by the neural network the processor is further configured to:
  detect and classify the information within the received image data; and
  identify whether the received image data includes a particular object wherein the particular object can be based on at least one of a certain shape, a certain material, and a certain substance.

18. A non-transitory computer readable medium embodying a computer program, the computer program comprising computer readable program code that when executed by a processor of an electronic device causes the processor to:
  receive image data and corresponding metadata;
  manipulate the received image data based on a set of transform parameters;
  analyze the manipulated image data, without using ground truth data, to generate metadata predictive of content in the received image data;
  analyze the corresponding metadata and the generated metadata to identify one or more features of the received image data;
  select, based on the identified one or more features, a neural network from a plurality of pre-trained neural networks; and then
  analyze the received image data using the selected neural network to extract information from the received image data.

19. The non-transitory computer readable medium of claim 18, further comprising program code that, that when executed at the processor, causes the processor to:
  predict features of the received image data based on the analysis of the manipulated image data;
  compare the extracted information to the predicted features; and
  adjust the selected neural network when the predicted features and the extracted information exceed a threshold.

20. The non-transitory computer readable medium of claim 18, further comprising program code that, that when executed at the processor, causes the processor to:
  detect and classify the information within the received image data;
  identify whether the received image data includes building infrastructure of a geographic area; and
  monitor the building infrastructure to detect whether a change of the building infrastructure occurred during a period of time.

* * * * *